(12) United States Patent
Majumdar et al.

(10) Patent No.: US 11,794,530 B2
(45) Date of Patent: Oct. 24, 2023

(54) TIRE WITH INTRINSIC SEALANT CONTAINING INTRINSIC CELLULAR INNERMOST LAYER

(71) Applicant: Triangle Tyre Co. Ltd., Weihai (CN)

(72) Inventors: Ramendra Nath Majumdar, Hudson, OH (US); Wang Dapeng, Weihai (CN)

(73) Assignee: Triangle Tyre Co. Ltd., Weihai (CN)

( * ) Notice: Subject to any disclaimer, the term of this patent is extended or adjusted under 35 U.S.C. 154(b) by 168 days.

(21) Appl. No.: 17/176,173

(22) Filed: Feb. 15, 2021

(65) Prior Publication Data

US 2021/0178835 A1 Jun. 17, 2021

Related U.S. Application Data

(63) Continuation-in-part of application No. 16/819,701, filed on Mar. 16, 2020, now Pat. No. 10,919,242, which is a continuation-in-part of application No. 14/991,575, filed on Jan. 8, 2016, now Pat. No. 10,589,478, which is a continuation-in-part of application No. 14/572,138, filed on Dec. 16, 2014, now Pat. No. 10,399,391.

(51) Int. Cl.
  *B60C 19/12* (2006.01)
  *B60C 19/00* (2006.01)

(52) U.S. Cl.
  CPC .......... *B60C 19/122* (2013.01); *B60C 19/002* (2013.01)

(58) Field of Classification Search
  CPC .................................................. B60C 19/002
  See application file for complete search history.

(56) References Cited

U.S. PATENT DOCUMENTS

| | | |
|---|---|---|
| 4,895,610 A | 1/1990 | Egan |
| 6,837,287 B2 | 1/2005 | Smith, Sr. et al. |
| 6,915,826 B2 | 7/2005 | Poling et al. |
| 6,962,181 B2 | 11/2005 | Deevers et al. |
| 7,073,550 B2 | 7/2006 | Reiter et al. |
| 7,674,344 B2 | 3/2010 | D'Sidocky et al. |

(Continued)

FOREIGN PATENT DOCUMENTS

| | | | | |
|---|---|---|---|---|
| DE | 19806935 A1 | * | 9/1999 | ............. B29D 30/06 |
| JP | 2005290139 A | * | 10/2005 | ............. C08F 236/10 |

OTHER PUBLICATIONS

Machine Translation: DE-19806935-A1, Dodt T, (Year: 2023).*

(Continued)

*Primary Examiner* — Kendra Ly
(74) *Attorney, Agent, or Firm* — Renner, Otto, Boisselle & Sklar, LLP

(57) ABSTRACT

A tire with in-situ generated intrinsic puncture sealant layers and intrinsic noise damper comprising a supporting tire carcass having one or more layers of ply, an outer circumferential tread, and a radially inner layer, a pair of beads, sidewalls extending radially inward from the axial outer edges of a tread portion to join the respective beads, a sealant comprising at least one layer of sealant, disposed radially inwardly from said radially inner layer of said tire carcass, an intrinsic cellular noise damper as the innermost layer adjacent to the sealant, wherein said noise damper has a density less than 1.3 g/cm$^3$; and wherein said sealant provides self-sealing properties to the tire.

17 Claims, 3 Drawing Sheets

(56) References Cited

U.S. PATENT DOCUMENTS

| | | | |
|---|---|---|---|
| 7,694,707 | B2 | 4/2010 | Agostini et al. |
| 8,293,049 | B2 | 10/2012 | Incavo |
| 8,316,903 | B2 | 11/2012 | Majumdar et al. |
| 8,534,331 | B2 | 9/2013 | Dubos et al. |
| 8,646,501 | B2 | 2/2014 | Ruegg, Jr. |
| 8,821,982 | B2 * | 9/2014 | Sostmann ............. B29B 7/7495 524/575.5 |
| 8,978,721 | B2 | 3/2015 | Tanaka et al. |
| 10,675,922 | B2 | 6/2020 | Jacob et al. |
| 10,737,539 | B2 | 8/2020 | Ruegg, Jr. et al. |
| 2001/0007892 | A1 * | 7/2001 | Minagawa ............ C08L 19/006 525/196 |
| 2005/0113502 | A1 | 5/2005 | Fitzharris Wall et al. |
| 2005/0215684 | A1 | 9/2005 | Fitzharris Wall |
| 2006/0108042 | A1 * | 5/2006 | Yukawa .................... B60B 3/04 181/208 |
| 2007/0137752 | A1 * | 6/2007 | Agostini ............... B60C 19/002 152/450 |
| 2009/0205765 | A1 | 8/2009 | Sostmann et al. |
| 2009/0308523 | A1 * | 12/2009 | Kuramori ............. B29D 30/00 156/123 |
| 2009/0314402 | A1 * | 12/2009 | Kuramori ............. B60C 19/002 152/155 |
| 2015/0107743 | A1 | 4/2015 | Seong |
| 2016/0167455 | A1 * | 6/2016 | Majumdar ............ B60C 19/122 156/115 |

OTHER PUBLICATIONS

Machine Translation: JP-2005290139-A, Katsumi T, (Year: 2023).*

G. Bohm, L Jia, and G. Stephanopoulos, "Core Rubber Recycling Problems and New Solutions", Tire Technology Expo, Hannover, Germany, Feb. 27, 2020.

* cited by examiner

TIRE WITH INTRINSIC SEALANT CONTAINING INTRINSIC CELLULAR INNERMOST LAYER

CROSS REFERENCE TO RELATED APPLICATIONS

This application is a continuation-in-part of, and claims the benefit of, U.S. patent application Ser. No. 16/819,701, filed Mar. 16, 2020, which is entitled "Pneumatic Tire with In-Situ Generated Sealant Composition by Chain Cessation of Ionic Butyl," which is a continuation-in-part of, and claims the benefit of, U.S. patent application Ser. No. 14/991,575, filed Jan. 8, 2016, which is entitled "Pneumatic Tire Having Sealant Layer," which is a continuation-in-part of, and claims the benefit of, U.S. patent application Ser. No. 14/572,138, filed Dec. 16, 2014, which is entitled "Pneumatic Tire Having Multiple Built-In Sealant Layers and Preparation Thereof," and is incorporated herein by reference.

BACKGROUND OF THE INVENTION

The present invention is directed to tires having one or more inner sealant layers, formed from sealant precursor layers during tire curing step along with the formation of cellular innermost layer.

Tires consist of multiple annular layers of different compounds, plies, belts, etc., and they are applied before cure in tire building drum for accurate alignment and for higher interlayer bond strengths. Joining and aligning layers before cure result in tire with better uniformity and durability.

Tire puncture is an inherent issue for rubber pneumatic tires. Because of that, sealants have been developed and placed as a layer inner to the tire tread and plies to minimize the impact of the puncture. The absence of suitable technology forces tire companies to apply annular sealant layers after the tires are cured. Examination of recent passenger car (PCR) sealant tires from major tire manufacturers showed no curing bladder markings at the innermost sealant cover layer thus indicating that annular sealant layers are applied after the tires are cured. Likewise, examination of innermost cellular layer of recent PCR tires with from major tire manufacturers are found to be based on polyurethane thus indicating that they are applied after the tires are cured. It is well known that cellular polyurethane does not have enough thermal stability to survive tire cure conditions of high temperature and pressure and will get flattened and thus losing its cellular structure. Presence of suitable innermost cellular layer in a tire is beneficial as it absorbs cavity noise in the primary frequency range between 200-250 Hz which travels inside vehicle cabin thus creating annoying noise to the occupants of the vehicle.

Moreover, the majority of commercially available PCR sealant tires have exposed sealant to tire cavity, which must have been applied after the tire was cured, otherwise, it would foul the curing bladder during tire cure. In addition, in tires where sealant is applied to cured tire, there is only physical bonding and absence of chemical bonding or interfacial cross-linking at the sealant and innerliner interface, which results in relatively poor adhesion. Poor adhesion may lead to separation of sealant from innerliner, thus losing nail hole sealing capability. Due to poor interfacial bonding, sealant may slide thus creating tire balancing issues. Likewise, in post-cure applied cellular layer, there is no interlayer chemical bonding thus creating weak bonding. Thus, application of cellular layer is limited to a narrow strip underneath tread where there is limited flexing and if it goes beyond belt edges into sidewall, cellular layer separation from innerliner is likely, causing balancing and other issues.

Application of sealant layer as well as cellular layer to a cured tire is cumbersome since the innerliner needs to be very clean prior to sealant application and/or cellular layer application for better physical bonding of sealant-to-innerliner and cellular layer-to-innerliner. The way most tires are manufactured, the innermost layer is mostly contaminated with silicones from inside tire paint and/or from curing bladder lubricant for easy removal of tire from bladder mold. Moreover, application of perfectly aligned sealant inside cured tire is cumbersome and time consuming. Tire building machines have laser guidance which help operators to perfectly align layers in tire building drum which is possible if sealant precursor or cellular precursor is applied before tire is cured so that sealant precursor forms sealant during cure and cellular precursor forms cellular layer during tire cure.

Sealants in cured tires need to have low viscosity (or low storage modulus, G') so that the sealants can easily flow and plug nail holes. Such low viscosity material cannot be directly applied in tire building drum as they will shift, fall off, or deform if applied in tire building drum. Further, punctures can occur at any temperature. A single layer of sealant of low viscosity may work very well at low temperature, but at high temperatures, it might achieve a very low viscosity, which would allow it to flow and pass out of tire during use and pollute and/or damage roadways. By depleting the tire sealant, the tire loses its puncture sealing capacity. Likewise, a single layer of sealant of high viscosity may be very good for high temperature but might be almost solid at cold temperature and thus unable to flow to plug puncture in tires at cold temperature. Thus, one layer of high viscosity sealant may be good for summer tire but it may not be good for winter tire. Likewise, one layer of low viscosity sealant may be good for winter tire but it may not be good for summer tire as it may displace during use or pass out from puncture as viscosity becomes very low at high temperature. For all season tire, two-layer sealant is preferred, one for low temperature puncturing sealing and one for high temperature puncture sealing. Moreover, high viscosity sealant layer will tightly hold the low viscosity sealant layer due to interfacial bonding and prevent its movement even when its viscosity become very low in summer months. So, the bonding between the multiple sealant layers must be good to prevent sealant movement particularly the one with low viscosity. Likewise, low density cellular polyurethane commonly applied inside cured tire have zero tack and will fall off if applied in tire building drum. Moreover, cellular polyurethane, if applied before tire cure, it does not have enough thermal stability to survive tire cure conditions.

Tires with built-in sealant layer are known in the art. Typically, these tire sealants are formed during tire cure by thermal degradation of peroxide-containing butyl-rubber-based sealant precursor layers, such as for example, U.S. Pat. Nos. 4,895,610; 6,962,181; 7,073,550; 7,674,344; and 8,293,049; and US Patent Publication Nos. 2005/0113502 and 2005/021568, the teachings of which are all hereby incorporated by reference. Sealant layers may be of black or non-black colors and may incorporate short fibers, such as polyester or polyurethane fibers, and other filler aggregate into sealant layers to help to plug nail hole punctures.

Tires with integral cellular structure are also known in the art but not of any commercial significance presently, although they are out-of-the box attempts to push the envelope. Tires where cellular polyurethane are applied inside cured tire have very low density. See, e.g., application Ser. No. 16/922,641 to Majumdar et al., filed Jul. 7, 2020, titled "Noise Damper Noise Damper Bonded to Tire using Adhesives," which has polyurethane density around 0.025 g/cm$^3$. If higher density material is applied, it will increase tire weight thus increasing the rolling resistance of tires. Increasing rolling resistance translates to lower fuel economy from vehicles equipped with such tire resulting in higher greenhouse gas emissions to the atmosphere causing global warming. Recent climate calamities in the world are responsible for global warming and countries are working in concert to prevent global warming e.g. Paris protocol. Moreover, higher density foam inside tire will insulate heat inside tire thus reducing its durability. Integral foam density, when generated inside tire, should preferably be less than 0.12 g/cm$^3$ if still not lower is not possible. U.S. Pat. No. 7,694,707/USPA 2007/0137752 taught that integral foam of density 0.28 g/cm$^3$ can be generated by using 25 phr OBSH blowing agent and density of foam reduces with increasing blowing agent. OBSH generates nitrogen gas when decomposed under tire cure conditions and higher the gas generated, reduces the foam density. Extrapolation of the teachings of U.S. Pat. No. 7,694,707/USPA 2007/0137752 has indicated that OBSH should be at a level of 50 phr to get reasonable foam density of 0.12 g/cm$^3$. Consistent with extrapolated data of U.S. Pat. Nos. 7,694,707, 8,978,721 has indicated that integral bromobutyl (BIIR) foam of density 0.139 g/cm$^3$ was achieved by using 50 phr azodicarbonamide. Azodicarbonamide predominantly liberates nitrogen gas with some carbon monoxide when decomposed with heat. 50 phr blowing agent to prepare foam of reasonable density is too high to have any commercial significance. Technology is presently lacking to generate integral cellular structure with tire that has density of 0.12 g/cm$^3$ or even lower that can be generated by using lower amount of blowing agent, for example, 25 phr or less.

Technology to build intrinsic sealant tire is available. Technology to apply low density polyurethane onto innerliner of cured tire is also available. Thus, technology to produce intrinsic sealant with a cellular polyurethane innermost layer is possible by integrating the above-mentioned two technologies. However, suitable technology for intrinsic cellular layer of low density (e.g. 0.12 g/cm$^3$ or less) is not available to form using reasonable amount of blowing agent (e.g. 20 phr or less). So, technology to integrate intrinsic sealant layer with intrinsic cellular layer is not available but highly desired.

BRIEF SUMMARY OF THE INVENTION

The invention relates to a tire with in-situ generated intrinsic puncture sealant layers and intrinsic noise damper comprising a supporting tire carcass having one or more layers of ply, an outer circumferential tread, and a radially inner layer, a pair of beads, sidewalls extending radially inward from the axial outer edges of a tread portion to join the respective beads, a sealant comprising at least one layer of sealant, disposed radially inwardly from said radially inner layer of said tire carcass, an intrinsic cellular noise damper as the innermost layer adjacent to the sealant, wherein said noise damper has a density less than 1.3 g/cm$^3$; and wherein said sealant provides self-sealing properties to the tire.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
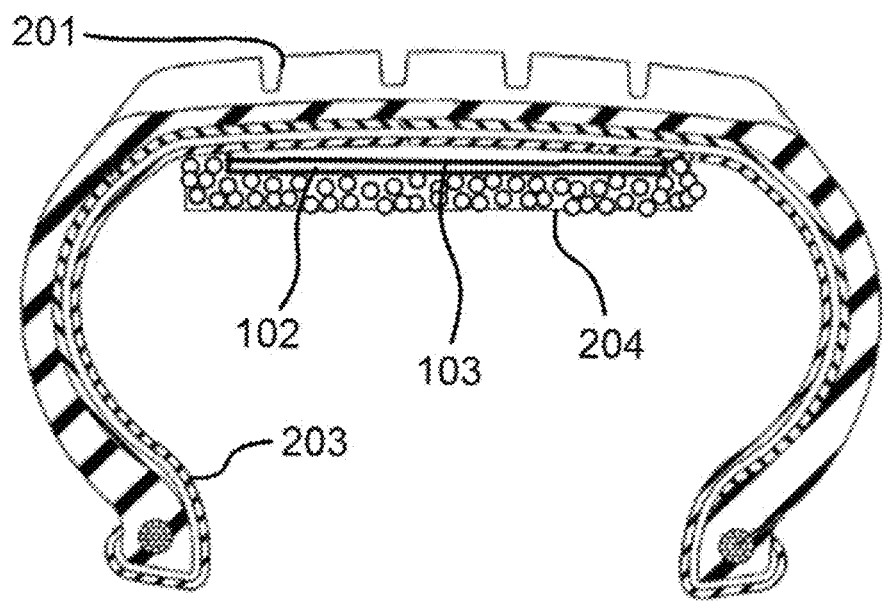
FIG. 1 is a bead-to-bead cross section of a tire of the present invention.

The present invention is directed to a tire having one or more intrinsic (or integral, or built-in) sealant layers formed from one or more precursor layers during tire cure by chain scission of regular butyl or butyl ionomer compositions catalyzed by peroxide.

Sealant Cover Layer

So that gases formed during chain scission catalyzed by peroxide, sealant cover layer composition should preferably be with high gas permeable rubber like natural rubber, butadiene rubber or styrene butadiene rubber.

Ultimate goal for tire manufacturers, like most other annular layers, is to apply cellular precursor or low density cellular layer in tire building drum so that low density (less than 0.12 g/cm$^3$) cellular material is attached to innerliner inside cured tire which has not been hitherto achieved. Property requirements for applying cellular material or precursor to cellular material in tire building drum is more stringent than application in green tire. For example, the material must be stretchable in all directions without tearing during the formation of green tire. The material must also have good tack-to-self and to innerliner so that the cellular precursor remains attached during expansion step of green (uncured) tire manufacturing. After cure, the cellular material must bond well to tire innerliner so that they do not fall off during tire use. E.g., cellular silicone rubber can be applied in green tire but the material does not have enough ability to stretch to survive expansion in tire building drum. Inventors of U.S. Pat. No. 7,694,707 applied precursor of cellular rubber in green tire and not in tire building drum (see examples 2 and 3 in the '707 patent). Inventors of U.S. Pat. No. 8,978,721 applied foam precursor containing 50 phr blowing agent in tire building drum and yet could not get density 0.12 g/cm$^3$ or lower. The instant patent application is directed to cellular precursor which can be applied in tire building drum and forms low density sound absorbing foam with strong bonding to innerliner during the tire curing steps using reasonable amount and combination of blowing agents (<20 phr) to get foam density lower than 0.12 g/cm$^3$. As used herein, "cellular" layer is also called "foam" layer which can be used interchangeably.

Three compositions mixed are shown in Table 11 (similar as U.S. Pat. No. 7,694,707 except that N660 is replaced by Ashbury 3772 or Hi-Black 420B). Densities obtained in metal mold are respectively 0.1118 g/cm$^3$, 0.1450 g/cm$^3$, 0.1012 g/cm$^3$ which was significantly lower than US'707 (0.49 g/cm$^3$ with 15 phr blowing agent). Next, bladder molding was tried with smooth side of bladder touching innerliner and again density of cellular layer obtained was significantly lower than in U.S. Pat. No. 7,694,707 particularly with compound 6C027B where density was 0.11 g/cm$^3$.

Next, bladder molding was tried with embossed side of bladder touching the rubber (lab simulated tire cure) and density of foam obtained with 7C026A is 0.15 g/cm³ which was significantly lower than previously achieved (US'707). In the case of compound 6C033C, density of cellular rubber obtained in metal mold and in lab simulated tire cure conditions are respectively 0.1012 g/cm³ and 0.53 g/cm³ thus indicating that density of cellular material formed is extremely sensitive to cure conditions. Table 11 shows by replacing carbon black in US'707 with more conductive filler like Ashbury 3772 or Hi-Black® 420, resulting cellular material density can be reduced 77% (0.49 g/cm³ vs 0.11 g/cm³).

TABLE 11

Three foam precursor formulations and comparison of foam density on curing inside a metal compression mold and bladder mold

|  | 6C027A | 6C027B | 6C033C |
|---|---|---|---|
| 1st Pass |  |  |  |
| Bromobutyl 2222 | 100 | 90 | 100 |
| Ionic Butyl I4564P | 0 | 10 | — |
| Naphthenic Oil) | 15 | 15 | 16.5 |
| Ashbury 3772 | 26 | 26 | — |
| Hi-Black ® 420B | — | — | 26 |
| Zinc Oxide | 1 | 1 | — |
| Stearic Acid | 2 | 2 | 2 |
| Koresin | 5.3 | 5.3 | 3 |
| SP1068 | 2 | 2 | 2 |
| 2nd Pass |  |  |  |
| Zinc Oxide | — | — | 1 |
| RM-Sulfur | 0.5 | 0.5 | 0.5 |
| MBTS | 1.24 | 1.24 | 1.3 |
| Celogen OT (OBSH) | 15 | 15 | 15 |
| Densities of foam formed inside cylindrical metal compression mold (diameter = 2.9 cm and height = 1.25 cm) which was 100% filled with precursor for 20 minutes at 350° F. |  |  |  |
| g/cm³ | 0.1118 | 0.1450 | 0.1012 |
| Co-cure in bladder mold with 100 BIIR innerliner compound (6C020A) for 20 min/350° F./200 psi. Dimensions of foam precursor 2.5" × 2.5" × 0.1" and 100BIIR innerliner compound = 6" × 6" × 0.06" |  |  |  |
| Smooth side of bladder touching rubber |  |  |  |
| Adhesion | Excellent | Excellent | — |
| Foam Density (g/cm³) | 0.167 | 0.11 | — |
| Embossed side of bladder touching rubber |  |  |  |
| Adhesion | Excellent | — | Excellent |
| Foam Density (g/cm³) | 0.15 | — | 0.53 |

Figure 6:
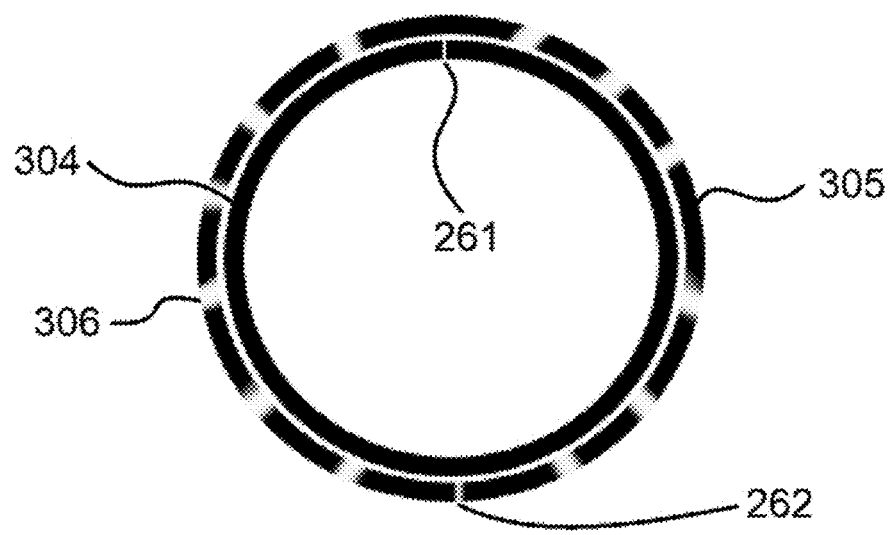
FIG. 6 is side view cross section showing solid and porous cellular precursor layers in tire building drum.

Next, two compositions tried are shown in Table 12 and 7C026A is very similar to US'707 and both contained substantial amount of N660 carbon black. Densities of foam produced are very low in metal mold (100% full) which is still lower when the metal mold is 90% full. During co-cure of innerliner and foam precursor with innerliner in lab simulated tire cure in bladder mold, densities from both 7C026A and 7C026B were high and this was consistent with U.S. Pat. No. 7,694,707. Increasing the thickness of precursor reduces the density somewhat. However, during lab simulated bladder curing, densities were significantly lower when some air pockets were kept for initial expansion. Final expansion occurred when the mold is opened to remove the cured material. This is possible by laminating first an innerliner and then foam precursor with die-punched holes in tandem with calendering, and then foam precursor without hole. Dies were of ¼ inches diameter and separation from centers of each holes were 0.7 inches. Cross section of such laminate is shown in FIG. 6. Foam density can be further reduced by optimizing the volume of initial expansion by controlling the number of holes in the laminate.

Table 11 shows low density foam formation using bromobutyl which has low degree of unsaturation or double bonds. Bromobutyl can be substituted with other rubber of low unsaturation, e.g., chlorobutyl rubber, butyl rubber, halobutyl rubber or ethylene propylene diene monomer (EPDM).

TABLE 12

Mixing and properties of two foam precursor layers

|  | 7C026A | 7C026B |
|---|---|---|
| 1st Pass |  |  |
| Bromobutyl 2222 | 100 | 100 |
| Stanplas 150 | 15 | 15 |
| Conductograph GFCS Sigratherm GFGS | — | 15 |
| N660 | 26 | 20 |
| Stearic Acid | 2 | 2 |
| Koresin | 7 | 7 |
| 2nd Pass |  |  |
| 75% DPG | — | 0.67 |
| Zinc Oxide | 1 | 1.5 |
| RM-Sulfur | 0.5 | 0.5 |
| MBTS | 1.3 | 1.3 |
| OBSH/Celogen OT | 15 | 15 |
| Densities of foam formed inside cylindrical metal compression mold (diameter = 2.9 cm and height = 1.25 cm) which was 100% filled and then 90% full with precursor for 20 minutes at 350° F. |  |  |
| Density when mold 90% Full (g/cm³) | 0.094 | 0.098 |
| Density when mold 100% Full (g/cm³) | 0.113 | 0.128 |
| CO-CURE WITH INNERLINER IN BLADDER MOLD at 350° F./200 psi/20 min |  |  |
| 1 Layer of Foam Precursor of 3 mm thickness |  |  |
| Foam density of above (g/cm³) | 0.270 | 0.281 |
| 2 Layers of Foam Precursor each of thickness 3 mm |  |  |
| Foam density of above (g/cm³) | 0.196 | 0.231 |
| 4" × 4" Precursor + one 4" × 4" perforated |  |  |
| Foam density of above (g/cm³) | 0.13 | 0.172 |

New compositions mixed are based on Exxpro™ 1603 (Brominated Copolymer of Isobutylene with paramethylstyrene with no unsaturation in main chain) without filler and are shown in Table 13. Very low density materials were obtained without even using a laminate of porous material. OBSH (p,p'-oxybis-(benzenesulfonyl hydrazide) alone at 15 phr level produced foam of density 0.08 g/cm³ while OBSH in combination with Safoam RIC (sodium bicarbonate+ citric acid blowing agent available from REEDY Chemical Foam) produced foam of density 0.07 g/cm³. Foam density can be reduced by using combination of blowing agents. It is anticipated that foam density can be further reduced by using a porous laminate of foam precursor (vide infra). In Table 13, Exxpro™ 1603 was initially received from ExxonMobile as developmental sample and the trade name changed to Exxpro™ 3563 after commercialization. Table 13 also shows that by introducing second blowing agent (Safoam RIC) in small amount (2 phr) in composition containing 15 phr main blowing agent (OBSH), density of foam formed is further reduced by 12.5% (0.08 g/cm³ vs 0.07 g/cm³).

TABLE 13

Foam densities formed from compositions based on Exxpro™ 1603 without filler

|  | 9C024BA | 9C024BB | 9C024DA | 9C024DB |
|---|---|---|---|---|
| $1^{st}$ mixing step | | | | |
| Exxpro™ 1603/Exxpro™ 3563 | 100 | 100 | 100 | 100 |
| Naphthenic oil | | | 10 | 10 |
| ZnO | 1 | 1 | 1 | 1 |
| SP 1045 | 1 | 1 | 1 | 1 |
| Mg-stearate | 1 | 1 | 1 | 1 |
| Duralink HTS | 1 | 1 | 1 | 1 |
| $2^{nd}$ mixing step | | | | |
| OBSH | 15 | 15 | 15 | 15 |
| Safoam RIC | 0 | 2 | 0 | 2 |
| Bladder Molding between nylon films with no release agent (350° F./12 min/220 psi) | | | | |
| Initial Thickness (inches) | 0.27 | 0.21 | 0.18 | 0.18 |
| Sticking to nylon | No | No | Slight | Slight |
| Density of Cellular material (g/cm³) | 0.08 | 0.07 | 0.08 | 0.07 |

Passenger tires were built using 9C024DA and 9C024DB cellular precursors. After tire builds, cellular materials formed were removed from tire. Sound absorption coefficients were measured at four frequency ranges using large impedance tube and compared with common polyester polyurethane foam (density 0.024 g/cm³) conventionally glued inside cured tire for cavity noise reduction and are recorded in Table 14.

Primary frequency range which travels inside vehicle cabin causing annoying sound is in the frequency range 200-250 Hz. Table 14 shows that when multiple pores were generated on the skin of the foam facing the cavity, noise absorption exceeded that of polyurethane foam of low density commonly attached inside cured tire. Noise absorptions are also higher at higher harmonic frequency ranges (500-1000 Hz).

This is novel achievement, showing that intrinsic foam of density lower than 0.1 g/cm³ can be generated by applying foam precursor containing less than 20 phr blowing agent in green (uncured) tire as done during conventional tire manufacturing which will reduce cavity noise which is higher than tires with polyurethane foam attached inside tire by cumbersome process after the tire is cured. As used herein, the term intrinsic means the foam noise damper is applied prior to cure, rather than a damper affixed to the tire using an adhesive post-cure. The term intrinsic could also be used as built-in, in-built, or integral interchangeably.

TABLE 14

Comparison of sound absorptions of intrinsic foam vs conventional polyether polyurethane

| Sample | Thickness (mm) | Density (g/cm³) | Sound Absorption at Different Frequencies (Hz) | | | |
|---|---|---|---|---|---|---|
| | | | 200 | 250 | 500 | 1000 |
| Polyether polyurethane | 19 | 0.024 | 0.05 | 0.07 | 0.14 | 0.36 |
| 9C024DA | 18 | 0.09 | 0.04 | 0.05 | 0.13 | 0.37 |
| 9C024DA w/Pores | 18 | 0.09 | 0.08 | 0.09 | 0.19 | 0.39 |
| 9C024DB | 18 | 0.09 | 0.05 | 0.06 | 0.12 | 0.56 |
| 9C024DB w/Pores | 18 | 0.09 | 0.07 | 0.08 | 0.15 | 0.50 |

Combination of OBSH and Expancel 930DU120 Blowing Agents

Foam precursor composition is shown in Table 17. When this composition was bladder molded with a layer of innerliner, the expansion was so high in all directions that the sample curled-up and could not be used for sound absorption tests. In tires, such curl up is not possible as tire casings are strong and rigid.

TABLE 17

Composition of foam precursor with Combination of Blowing Agents

|  | 8C029C4 |
|---|---|
| $1^{st}$ Pass | |
| Bromobutyl 2222 | 100 |
| Stanplas 150 | 15 |
| N660 | 26 |
| Zinc Oxide | 1 |
| Stearic Acid | 2 |
| Koresin | 7 |
| $2^{nd}$ Pass | |
| RM-Sulfur | 0.5 |
| MBTS | 1.3 |
| ZMBT | |
| MBT | 0.65 |
| $3^{rd}$ Pass | |
| Expancel 930DU120 | 3 |
| OBSH/Celogen OT | 15 |

The following procedure was utilized to keep sample straight so that noise absorption coefficients can be tested from laboratory samples without the need to build tires.

Bladder Molding with Rigid Metal Mesh Support

6"×6"×0.1" of 100BIIR-based innerliner was placed on the top of 6 inches diameter wire mesh. Then foam precursors (5"×5"×0.12") of 8C029C4 were placed on the top of innerliner and then cured in laboratory simulated tire cure in a bladder mold (20 minutes at 350° F./250 psi). Cured laminates did not curl up and remained straight and was used for sound absorption tests.

Sound Absorption Tests

Metal and innerliner were removed from 8C029C4 samples before sound absorption test. Normal incidence sound absorption tests were run using large tube in the frequency range 100-1600 Hz (ASTM E1050-12) for polyether polyurethane commonly used inside tire and compared with 8C029C4. Sound absorption tests were repeated after punching multiple perforations through the foam skin but not through the entire foam for 8C029C4 sample. Perforations were performed by building a piece of equipment using stapler wire for perforations and were 1 to 5 mm apart in the samples. Sound absorption coefficients in the frequencies 225 Hz, 450 Hz and 675 Hz are shown in Table 18.

TABLE 18

Sound absorption at Different frequencies

| Sample | Sound Absorption at Different Frequencies | | |
|---|---|---|---|
| | 225 Hz | 450 Hz | 675 Hz |
| Polyether polyurethane of density 0.024 g/cm$^3$ | 0.07 | 0.125 | 0.22 |
| 8C029C4 after removal of innerliner and wire mesh | 0.045 | 0.165 | 0.335 |
| Above after multiple surface perforations | 0.075 | 0.04 | 0.25 |

Sound absorption from this foam is lower than control polyurethane foam after perforation at the approximate primary cavity noise frequency range (225 Hz).

Filler Containing Exxpro™ Based Foam Precursor

Previously, low density foams were generated by lab simulated tire curing in bladder mold to density as low as 0.07 g/cm$^3$ in Exxpro™ based rubber without filler (Table 13). Further reduction in density is expected by creating space for initial expansion as described earlier (FIG. 6). This technique opens up the possibility to prepare foam of very low density intrinsic foam inside tire which is highly desirable in future tires. Thus, composition with 15 phr blowing agent (OBSH) generated foam of density 0.49 g/cm$^3$ (U.S. Pat. No. 7,694,707). Composition similar as U.S. Pat. No. 7,694,707 generated foam of density 73.5% lower i.e. 0.13 g/cm$^3$ when 10% volume was kept for initial expansion during lab simulated tire curing in a bladder mold (7C026A in Table 12). Foam density can further be reduced by optimizing the volume kept for initial expansion during lab simulated tire cure.

Table 19 shows Exxpro-based foam precursor with filler. During bladder molding, it generated low density foam of 0.11 g/cm$^3$. If initial expansion of 10% is created during bladder molding, if that reduces density by 73.5% as before, thus extrapolation shows that foam of density 0.023 g/cm$^3$ can be prepared. Density of 0.023 g/cm$^3$ is even smaller than polyurethane foam conventionally glued inside tire (0.24-0.35).

TABLE 19

Exxpro ™ 1603 based foam precursor containing filler

| | 9C034AE |
|---|---|
| Exxpro ™ 1603 | 100 |
| N660 | 26 |
| Naphthenic oil | 10 |
| ZnO | 1 |
| SP 1045 | 1 |
| Mg-stearate | 1 |
| Duralink HTS | 1 |
| 2$^{nd}$ mixing step | |
| OBSH | 15 |
| Safoam RIC | 0.5 |
| Bladder Molding between nylon film 350° F./220 psi/12 min | |
| Precursor dimensions | 3" × 3" × 0.163 |
| Mold Release | Stoner A353 |
| Density (g/cm3) | 0.11 |

Examples shown in Tables 11, 12, 17 and 19 utilized black colored fillers which give rise to black compound with black cellular material. To prevent mix up of cellular precursor with other commonly used black tire compounds, the precursor can be made non-black by using white filler e.g. silica, titanium dioxide and then combined with a non-black color concentrate.

No prior art exists where intrinsic foam without splice is prepared in concert with integral sealant. However, some prior art exists where foam is applied on the top of sealant tire as described in US 2015/0107743, US 2016/0347127, and U.S. Pat. No. 10,675,922. Prior art exists for intrinsic sealant tire, typically, in such tires, sealants are formed during tire cure by thermal degradation of peroxide-containing butyl-rubber-based sealant precursor layers, such as for example, U.S. Pat. Nos. 4,895,610; 6,962,181; 7,073,550; 7,674,344; and 8,293,049; and US Patent Publication Nos. 2005/0113502 and 2005/021568, the teachings of which are all hereby incorporated by reference. Sealant layers may be of black or non-black colors and may incorporate short fibers, such as polyester or polyurethane fibers, and other filler aggregate into sealant layers to help to plug nail hole punctures. Prior art exist to build intrinsic cellular layer in a tire but density of cellular layer is much higher than needed and the amount of blowing agent used is too high to be of any practical significance.

A series of experiments were conducted on combining an in-situ generated intrinsic sealant (or multiple sealant layers) and an in-situ generated intrinsic noise damper. The materials used are as follows:

Exxpro™ 1603 (Brominated Copolymer of Isobutylene with paramethylstyrene with no unsaturation in main chain. Exxpro™ 1603 was initially received from ExxonMobile as developmental sample and the trade name changed to Exxpro™ 3563 after commercialization.)

OBSH is p,p'-oxybis-(benzenesulfonyl hydrazide) and was obtained from Western Reserve Chemical.

Safoam RIC is sodium bicarbonate+citric acid blowing agent available from REEDY Chemical Foam.

Vul-Cup 40KE is alpha,alpha-bis(t-butylperoxy)diisopropylbenzene, 40 weight % in inert carrier. It is a product of Arkema.

SP 1045 is octylphenol-formaldehyde resin that contained methylol groups and is available from SK Capital/SI Group.

Silene™ 732D is precipitated silica from PPG Industries.

X_Butyl RB 100 abbreviated as Butyl 100 is a product of Arlanxeo.

Perkalink 900 is 1,3-bis(citraconimidomethyl)benzene and is available from RheinChemie Duralink HTS is Hexamethylene-1,6-bis(thiosulfate), disodium salt available from Eastman.

Agilon 400G is functional silica from PPG Industries

TABLE 20

Composition of cellular precursor

| | 0C027-2 | 0C027-6 |
|---|---|---|
| 1$^{st}$ Mixing Step | | |
| Exxpro ™ 1603 | 100 | 100 |
| Naphthenic oil | 10 | 10 |
| ZnO | 1 | 1 |
| SP 1045 | 1 | 1 |
| Zinc Stearate | 2 | 2 |
| Mg-stearate | 1 | 1 |
| Duralink HTS | 1 | 1 |
| 2$^{nd}$ Mixing Step | | |
| OBSH | 15 | 15 |
| Safoam RIC | | 0.5 |

Innerliner compound is based 100 phr bromobutyl (BIIR rubber) which is commonly used during tire making.

TABLE 21

Compositions of sealant precursor

| Composition | 0C020B |
|---|---|
| 1st Step | |
| Butyl 100 | 100 |
| Wingtack 86 | 5 |
| Naphthenic Oil Stanplas 150 | 5 |
| Silene 732D | 20.00 |
| Hard Clay/Natka 1200 | 10.00 |
| Titanium Dioxide (Rutile) | 2.0 |
| Talc (Mistron Vapor Powder) | 0.5 |
| Yellow pigment in EP (E7884) | 0.5 |
| Struktol HPS11 | 2 |
| 2nd step | |
| Vul-Cup ® 40KE | 5 |

Compositions of sealant cover layer

| Composition | 0C028A |
|---|---|
| 1st Step | |
| High cis BR (Buna CB 1220) | 50 |
| NR (SMRL) | 50 |
| Agilon 400G | 30 |
| Naphthenic oil (Stanplas 150) | 6 |
| TMQ | 1.5 |
| Perkalink 900 | 2 |
| 6PPD | 1.5 |
| Microcrystalline wax (Akrowax Micro 23) | 2 |
| 2nd Step | |
| CBS/CBTS | 1 |
| ZnO | 1.25 |
| RM Sulfur | 1.25 |

Three layers were laminated details of which are shown in Table 22. After lamination, they were bladder molded under laboratory simulated tire cure (350° F./220 psi/12 min). Normal incidence sound absorption coefficients were determined at three frequency ranges—225 Hz, 450 Hz and 675 Hz using large impedance tube and details of which are shown in Table 22

TABLE 22

Noise Absorptions coefficients at three different frequencies

| # | Bladder Molded Laminate | 225 Hz | 450 Hz | 675 Hz |
|---|---|---|---|---|
| C4 | 6" × 6" × 0.15" innerliner<br>4" × 4" × 0.15" Sealant precursor (0C020B)<br>4.5" × 4.5" × 0.03" Sealant Cover (0C028A) | 0.01 | 0.02 | 0.05 |
| D2 | 6" × 6" × 0.15" innerliner<br>4" × 4" × 0.15" Sealant precursor (0C020B)<br>4.5" × 4.5" × 0.07" Foam Precursor (0C027-6) | 0.03 | 0.10 | 0.27 |
| E1 | 6" × 6" × 0.15" innerliner<br>4" × 4" × 0.15" Sealant precursor (0C020B)<br>4.5" × 4.5" × 0.15" Foam Precursor (0C027-06) | 0.03 | 0.12 | 0.34 |
| F1 | 6" × 6" × 0.15" innerliner<br>4" × 4" × 0.15" Sealant precursor (0C020B)<br>4.5" × 4.5" × 0.07" Foam Precursor (0C027-2) | 0.03 | 0.08 | 0.18 |

TABLE 22-continued

Noise Absorptions coefficients at three different frequencies

| # | Bladder Molded Laminate | 225 Hz | 450 Hz | 675 Hz |
|---|---|---|---|---|
| G3 | 6" × 6" × 0.15" innerliner<br>4" × 4" × 0.15" Sealant precursor (0C020B)<br>4.5" × 4.5" × 0.15" Foam Precursor (0C027-2) | 0.04 | 0.12 | 0.17 |

Results and Discussion

Two cellular precursor compositions tested are shown in Table 20. Composition of sealant precursor is shown in Table 21. Innerliner used is based on 100 phr bromobutyl rubber (BIIR) and composition of such innerliner is well known to those familiar with the art. Five 3-layer laminates were bladder molded and are shown in Table 22. C4 is the control sample without a cellular layer and the sealant is protected using a sealant cover layer. In samples D2 and E1, sealant cover layer is replaced by cellular cover layer formed from cellar precursor (0C027-6) of respective thicknesses 0.07" and 0.15". In both cases, higher noise absorption coefficients relative to control (C4) are observed near the primary cavity noise frequency (225 Hz) and at higher harmonic frequency ranges. Similar higher noise absorption coefficients are found when sealant cover is replaced by cellular material formed from 0C027-2 precursor. Thus, replacement of non-cellular sealant cover with cellular sealant cover leads to reduction in cavity noise which is disturbing to occupants of vehicle riding on such tire is reduced to practice.

Figure 2:
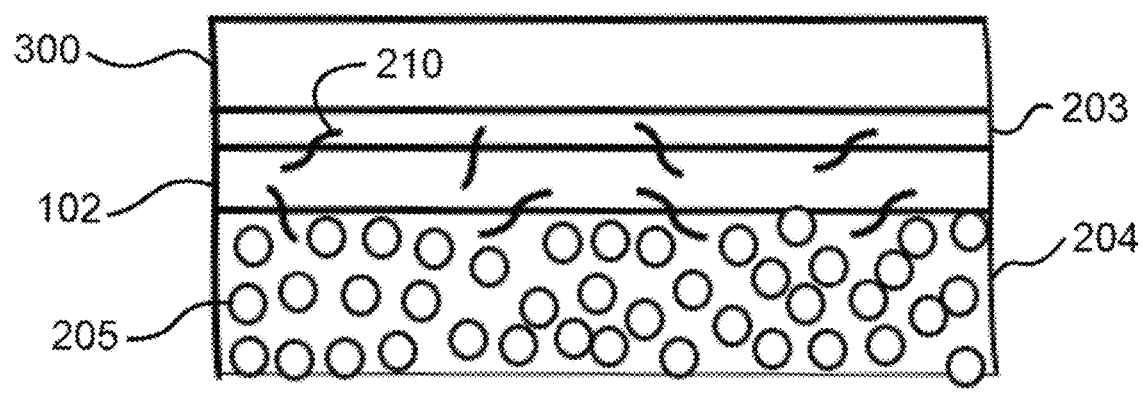
FIG. 2 is an enlarged view of the tire of FIG. 1.

FIG. 1 shows the bead-to-bead cross section of a tire where intrinsic noise damper layer 204 is applied directly on the top of (i.e. inner to) the intrinsic sealant layer 102, 103. As shown herein, and used in this application, there can be a single sealant layer, or multiple sealant layers. When "sealant layer" is used, it is intended to mean either a single layer of sealant, or a sealant layer that comprises multiple sandwiched layers of sealants. As shown, the noise damper 204 can extend wider than the width of the sealant layer 102, 103 and act as a cover layer. In this way, a separate cover layer is not required. In FIG. 1, 203 is innerliner and 201 is tread, FIG. 2 shows a close up view of the layers shown in FIG. 1. For ease of understanding the invention, all layers between the tread 201 and innerliner 203 have been grouped into a single layer 300. These are standard versions of tire construction known in the art and not unique to this invention. The bond between the innerliner 203 and the sealant layer(s) 102 is strong due to interfacial cross-linking 210 that occurs during cure. This interfacial bonding is significantly stronger than simple adhesives found in typical noise damper applications in cured tire. Similarly, the bond between the sealant layer 102 and the foam noise damper 204 is strong due to interfacial cross-linking 210. The noise damper 204 is a foam composition containing multitudes of voids or pores 205, which aid in noise reduction. As noted above, sealant layer 102 can be a single sealant or multiple sealants.

Figure 3:
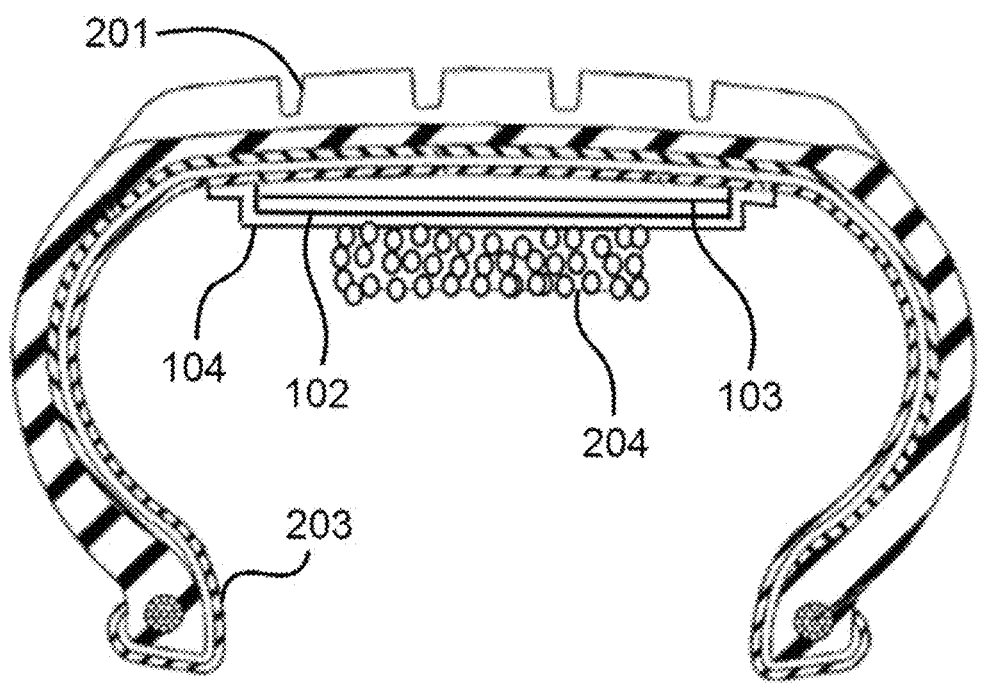
FIG. 3 is an alternate embodiment of the tire in FIG. 1.

FIG. 3 shows an alternate embodiment of the tire of FIG. 1 with intrinsic cellular foam noise damper layer 204 is applied on the top of (i.e. inner to) intrinsic sealant cover layers 104. As shown the noise damper 204 is narrower than the sealant layer(s) 102, 103, so a sealant cover layer 104 is used to prevent contamination of tire curing bladder.

Figure 4:
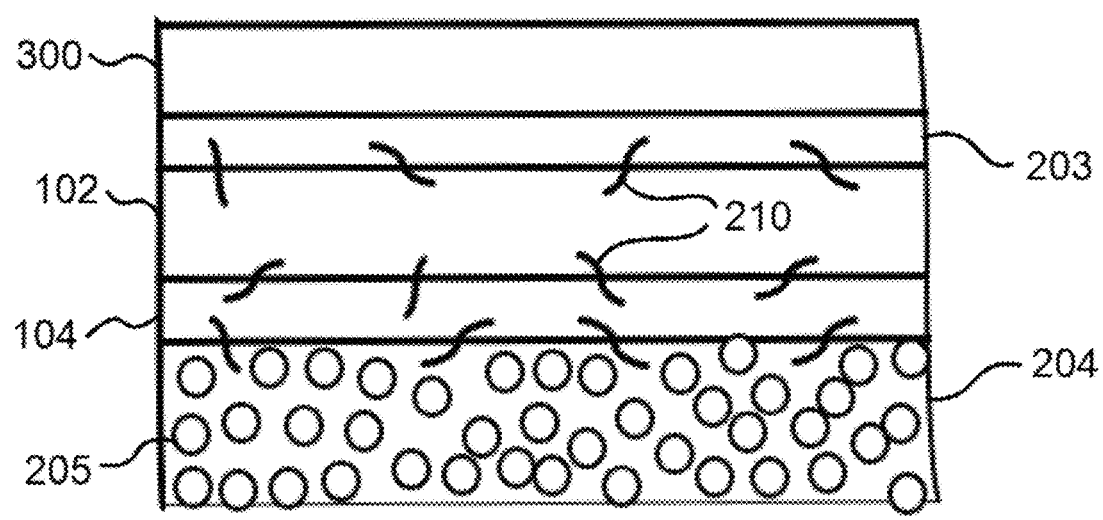
FIG. 4 is an enlarged view of the tire of FIG. 3.

FIG. 4 shows a close up view of the layers shown in FIG. 3. For ease of understanding the invention, all layers between the tread 201 and innerliner 203 have been grouped into a single layer 300. These are standard versions of tire construction known in the art and not unique to this invention. As noted above, the bond between the innerliner 203 and the sealant layer(s) 102 is strong due to interfacial cross-linking 210 that occurs during cure. This interfacial bonding is significantly stronger than simple adhesives found in typical noise damper applications after tire cure. Similarly, the bonds between the sealant layer 102 and the sealant cover layer 104, and between the cover layer 104 and the foam noise damper 204 are strong due to interfacial cross-linking 210.

Figure 5:
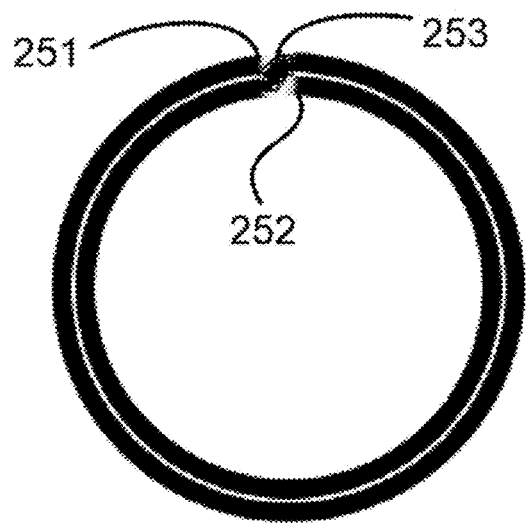
FIG. 5 is a side view cross section showing orientation of two layers of cellular precursor application in tire building drum.

FIG. 5 shows a side view cross sectional orientation of two layers of cellular precursor application in drum, where the layer is coiled upon itself such that the first end 251 and second end 252 are separated by the midpoint 253 of the precursor layer.

FIG. 6 shows a side view cross section showing solid and porous cellular precursor layers. The innermost layer is a foam precursor layer 304, with an inner splice 261; and the outer layer is a perforated foam precursor layer 305 that has been machined with holes 306, with an outer splice 262.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A tire with in-situ generated intrinsic puncture sealant and intrinsic noise damper comprising:
   a supporting tire carcass having an outer circumferential tread, and a radially inner layer,
   a pair of beads,
   sidewalls extending radially inward from the axial outer edges of a tread portion to join the respective beads,
   a sealant comprising at least one layer of sealant, disposed radially inwardly from said radially inner layer of said tire carcass,
   an intrinsic cellular noise damper as the innermost layer adjacent to the sealant,
   wherein said noise damper comprises brominated copolymer of isobutylene with paramethylstyrene;
   wherein said noise damper has a density less than 0.13 g/cm$^3$; and
   wherein said sealant provides self-sealing properties to the tire.

2. The tire of claim 1 wherein said sealant has a width and the noise damper has a width that is greater than or equal to the width of the sealant.

3. The tire of claim 1 wherein said sealant cover layer comprised predominantly of a rubber selected from natural rubber, butadiene rubber, and styrene-butadiene rubber, and combinations thereof.

4. The tire of claim 1 wherein said sealant is substantially free of solvent.

5. The tire of claim 1 wherein said sidewalls extending radially inward from the axial outer edges of the tread portion to join the respective beads form a tire cavity, and wherein said sealant is not exposed to said tire cavity.

6. The tire of claim 1, wherein said noise damper has a density of 0.1 g/cm$^3$ or less.

7. The tire of claim 1, wherein said noise damper has a density between 0.02 g/cm$^3$ to 0.12 g/cm$^3$.

8. Tire of claim 1, wherein said noise damper has a non-black color.

9. Tire of claim 1, wherein said noise damper has a black color as a result of additives selected from conductive graphite, conductive black, carbon black filler, and combinations thereof.

10. Tire of claim 1, wherein said noise damper is substantially free of any filler.

11. Tire of claim 1, wherein said noise damper further comprises a rubber selected from halobutyl rubber, bromobutyl rubber, chlorobutyl rubber, butyl rubber, ionic butyl, and ethylene propylene diene monomer, and combinations thereof.

12. The tire of claim 1, wherein said noise damper further comprises filler selected from graphite, conductive black, carbon black, silica, titanium dioxide, and color pigments, and combinations thereof.

13. The tire of claim 1, wherein a sealant cover layer is disposed between said noise damper and said sealant.

14. The tire of claim 13 wherein said sealant has a width and the noise damper has a width that is less than or equal to the width of the sealant.

15. The tire of claim 1, wherein said at least one layer of sealant comprise two layers of sealant.

16. The tire of claim 15, wherein said two layers have different viscosities.

17. The tire of claim 15 wherein said sealant is chemically bonded both to its outer layer and to the innermost layer.

* * * * *